US006558690B2

(12) United States Patent
Portman

(10) Patent No.: US 6,558,690 B2
(45) Date of Patent: May 6, 2003

(54) NUTRITIONAL COMPOSITION FOR IMPROVING THE EFFICACY OF A LIPASE INHIBITOR

(75) Inventor: Robert Portman, Fair Haven, NJ (US)

(73) Assignee: Pacific Health Laboratories, Inc., Woodbridge, NJ (US)

( * ) Notice: Subject to any disclaimer, the term of this patent is extended or adjusted under 35 U.S.C. 154(b) by 0 days.

(21) Appl. No.: 10/017,278

(22) Filed: Dec. 14, 2001

(65) Prior Publication Data

US 2002/0110580 A1 Aug. 15, 2002

Related U.S. Application Data

(60) Provisional application No. 60/255,854, filed on Dec. 15, 2000.

(51) Int. Cl.[7] ............................................. A61K 47/30
(52) U.S. Cl. ........................................................ 424/439
(58) Field of Search ......................................... 424/439

(56) References Cited

U.S. PATENT DOCUMENTS

| | | | |
|---|---|---|---|
| 4,491,578 A | 1/1985 | Peikin |
| 4,833,128 A | 5/1989 | Solomon et al. |
| 4,970,207 A | 11/1990 | Sato et al. |
| 5,086,042 A | 2/1992 | Rosamond |
| 5,187,154 A | 2/1993 | Phillips et al. |
| 5,314,886 A | 5/1994 | Becker et al. |
| 5,382,664 A | 1/1995 | Sato et al. |
| 5,470,839 A | 11/1995 | Laughlin et al. |
| 5,556,969 A | 9/1996 | Chambers et al. |
| 5,609,904 A | 3/1997 | Koh et al. |
| 5,674,896 A | 10/1997 | Yoshida et al. |
| 5,703,052 A | 12/1997 | Deninno et al. |
| 5,750,353 A | 5/1998 | Kopin et al. |
| 5,814,316 A | 9/1998 | Cook et al. |
| 5,827,517 A | 10/1998 | Cook et al. |
| 5,932,561 A | 8/1999 | Meyers et al. |
| 5,989,584 A | 11/1999 | Cook et al. |
| 6,039,985 A | 3/2000 | Kamarei |
| 6,355,612 B1 | 3/2002 | Ballevre et al. |

FOREIGN PATENT DOCUMENTS

WO     WO 0022937     4/2000

*Primary Examiner*—Michael V. Meller
(74) *Attorney, Agent, or Firm*—Gibbons, Del Deo, Dolan, Griffinger, and Vecchione

(57) ABSTRACT

A nutritional intervention composition is provided for enhancing the efficacy of an orally administered lipase inhibitor comprising a protein component of at least a glycomacropeptide or caseinmacropeptide, at least one $C_{12\text{-}18}$ fatty acid comprising at least oleic acid and a fiber preferably comprising both soluble and insoluble fibers. The composition is administered concurrently with the lipase inhibitor to negate the action of the latter in inhibiting the release of cholecystokinin (CCK) which, in turn, reduces the feeling of satiety and stimulates appetite. These effects are all countered by the subject compositions which stimulate release of CCK and increase the level of bile in the intestine. These effects achieved by the subject nutritional intervention compositions, while not directly increasing the effectiveness of the lipase inhibitor, nonetheless enhance its efficacy.

9 Claims, No Drawings

NUTRITIONAL COMPOSITION FOR IMPROVING THE EFFICACY OF A LIPASE INHIBITOR

RELATED APPLICATIONS

This application is a continuation of Provisional Patent Application No. 60/255,854 filed Dec. 15, 2000.

The present invention relates to a nutritional composition that is taken with a lipase inhibitor prior to the consumption of a meal which enhances the efficacy of the lipase inhibitor by increasing CCK levels and enhancing and extending post meal satiety.

BACKGROUND OF THE INVENTION

Lipase inhibitors are being prescribed for weight reduction in obese patients. A lipase inhibitor functions by inhibiting gastric and pancreatic lipases, thereby rendering them temporarily unavailable to hydrolyze dietary fat in the form of triglycerides into absorbable free fatty acids and monoglycerides. The undigested triglycerides are excreted without being metabolized. As the undigested triglycerides are not absorbed, the resulting caloric deficit may have a positive effect on weight control.

Clinical studies have shown that lipase inhibitors, taken prior to consuming a meal containing a moderate amount of fat, significantly increase the excretion of fat. In this fashion, a lipase inhibitor produces weight loss by blocking a percentage of fat that would normally be absorbed. Indeed, it has been shown that lipase inhibitors, such as the prescription drug tetrahydrolipstatin, generically known as Orlistat, are effective in obesity management. Cholecystokinin (CCK) is a peptide released following the consumption of food which is a major satiety signal in humans. Studies have shown that individuals receiving CCK demonstrate a reduction in caloric intake of from about 16–22%. Although the full mechanism whereby CCK exerts its effect on satiety is not known, there appear to be two components, a central component involving CCK receptors in the brain and a peripheral component involving the stomach and small intestine. When food is consumed, CCK releasing protein (CCKRP) is released in the small intestine. CCKRP stimulates CCK release from intestinal cells.

The release of CCK slows gastric emptying and generates the behavioral symptoms associated with satiety. At the same time CCK activates a number of negative feedback mechanisms that effectively shut down the CCK response. There are two primary negative feedback mechanisms, one involving proteases secreted by the pancreas and the second bile salts released from the gallbladder. CCK stimulates the pancreas to secrete a number of proteases, specifically trypsin and chymotrypsin, which inactivate CCKRP thereby effectively reducing its own release. CCK also stimulates gallbladder contraction causing bile salts to be released into the intestinal lumen. Bile salts are powerful regulators of CCK, inhibiting its release.

It is known that fat is a powerful stimulus for the release of CCK in the body. Hence, it might be expected that a lipase inhibitor, by reducing the metabolism of triglycerides, would decrease the release of CCK in the body. In fact, Borovicka et al. *Gut,* 2000:46:774–781 report studies showing that a lipase inhibitor, such as Orlistat, accelerated gastric emptying of both the solid and fat phases of a mixed meal and decreased CCK release. These additional actions of lipase inhibitors can profoundly affect normal appetite control mechanisms controlled by CCK. By this is meant that, by decreasing CCK levels, lipase inhibitors interfere with normal appetite control mechanisms. This has important implications for individuals attempting to lose weight using a lipase inhibitor. On one hand, a lipase inhibitor increases the amount of fat excreted. While a lipase inhibitor exerts a positive effect in promoting the excretion of malabsorpted fat. However, by doing so, lipase inhibitors negatively impact the normal physiological mechanism that turns off appetite. Thus, over time, individuals taking a lipase inhibitor would feel more hungry and, as a result, may consume more calories.

It is the logical conclusion, therefore, that the effect of a lipase inhibitor on CCK may, in part, negate its action on fat excretion since weight loss is a function of caloric intake, caloric utilization and excretion. This has been substantiated by Feinle et al. Gastroenterology 2001: 120: 1100–1107 who describe the interrelation between lipase inhibitors and CCK and state that, although the malabsorption of fat is maintained by the lipase inhibitor tested during long-term administration, the mean weight loss is less than would be predicted by the degree of fat malabsorption.

Compositions that stimulate satiety are known. U.S. Pat. No. 4,833,128 discloses the oral administration of phenylalanine in conjunction with protein, carbohydrate and fat to stimulate satiety. It is stated that consumption of a dietary supplement containing phenylalanine fifteen minutes prior to a meal generates a feeling of satiety resulting in reduced food consumption. The presence of phenylalanine in the disclosed preparations limits their use in patients with phenylketonuria. Finally, the patent makes the statement, alluding to a literature citation, that the appetite suppression of CCK may be merely temporary resulting in a limited satiety effect, possibly followed by a "rebound" of weight gain.

U.S. Pat. No. 4,491,578 discloses the oral administration of a trypsin inhibitor to enhance satiety by stimulating the release of CCK. This patent teaches that the release of trypsin from the pancreas provides a negative feedback signal for cholecystokinin secretion. The administration of a therapeutically effective quantity of trypsin inhibitor, therefore, blocks the trypsin released from the pancreas, thereby interfering with the negative feedback mechanism from reducing the release of CCK.

U.S. Pat. No. 5,932,561 teaches that dietary supplements that bind lipids can aid in weight loss and reduce cholesterol. The patent discloses a dietary supplement composition that combines chitosan and saponins from aloe and states that the latter increases the capacity of chitosan to bind fat. The saponins also act as a laxative to off set the constipating effects of chitosan. This patent does not teach that either chitosan or saponins can be used to stimulate cholecystokinin. The weight management characteristics of the disclosed compositions are to primarily the result of its capacity to combine with fat and cholesterol and remove them from the body.

U.S. Pat. No. 5,703,052 teaches that saponins are useful in controlling hypercholesterolemia. However, pure saponins must be utilized in massive amounts to exert a significant effect on the absorption of cholesterol unless they are combined with another moiety, such as certain steroidal glycosides. There is neither teaching nor disclosure of the possible use of saponins as a stimulator of CCK There is no indication in any of the patents described above that the compositions described therein, or for that matter any composition, would be useful in conjunction with a lipase inhibitor for weight control. There is no recognition in the art that any nutritional or intervention composition would possess such capacity. There is a definite need in the art for a safe and effective nutritional composition that can be taken in conjunction with a lipase inhibitor which would stimulate CCK release, thereby enhancing the effectiveness of a lipase inhibitor. Such compositions are provided in accordance with the present invention.

SUMMARY OF THE INVENTION

In accordance with the present invention, there is provided a method of enhancing the efficacy of a lipase inhibitor utilized in a weight reduction program by administering in conjunction therewith an intervention composition comprising a glycomacropeptide, one or more long chain fatty acids and at least one of soluble and insoluble fibers. The subject nutritional intervention compositions, which may additionally contain other proteins, a source of calcium and conventional flavoring agents and artificial sweeteners, may be administered in combination with certain solid or liquid foods, including water.

DETAILED DESCRIPTION OF THE INVENTION

In accordance with the present invention, it has been found that a nutritional intervention composition, given in conjunction with a lipase inhibitor, significantly enhances the efficacy thereof in a weight management program. By this is meant that the subject compositions do not actually make the lipase inhibitor more therapeutically effective. Rather, they act to enhance the efficacy thereof by acting to negate the tendency of the lipase inhibitor to increase the patient's appetite over the course of therapy as described below, thereby making the lipase inhibitor therapy less effective. The compositions of the present invention, administered in accordance with the subject method, stimulate the release of cholecystokinin (CCK) thereby increasing post meal satiety. The stimulating effect of the subject compositions on CCK release acts to negate the tendency for the lipase inhibitor to increase appetite. By this is meant that the lipase inhibitor, by blocking the metabolism of triglycerides so that they pass from the body, indirectly blocks the release of CCK as discussed in the preceding section.

It will be appreciated that, although exerting a positive effect on fat metabolism in a weight management program, lipase inhibitors may over time actually stimulate appetite as a result of the loss of the feeling of satiety following a meal due to the reduced level of CCK released. As a result, the individual will have a tendency to eat more. The overall effect has been shown to be a slowing of the weight gain from what might have been expected from the initial results experienced with the lipase inhibitor. This effect can be experienced regardless of the clinical purpose for prescribing the lipase inhibitor. Obviously, the degree to which this occurs will vary with the individual even as will the effect of the lipase inhibitor itself in a weight management program.

The nutritional intervention composition of the invention counter the negative influence of lipase inhibitors on appetite by stimulating the release of CCK. This effect stimulates and maintains the feeling of satiety, thereby negating the tendency of the individual taking a lipase inhibitor to eat more. In addition, the subject compositions act to stimulate negative feedback mechanisms involving the gall bladder's release of bile salts which inhibit CCK release thereby resulting in a decrease in satiety. The latter effect of the nutritional intervention compositions of the invention is believed to reduce the level of bile salts in the intestine which, in turn, reduces the inhibiting effect of the bile salts on the release of CCK. The overall result is an increase in the efficacy of the lipase inhibitor, especially over time, and a more effective weight control program given that the subject compositions are, themselves, effective in weight management as a result of their stimulating effect on CCK release and the extension of the feeling of satiety.

In accordance with the present invention, the subject compositions are taken with a lipase inhibitor. While it is within the scope of the present invention that the subject compositions could be physically combined with a lipase inhibitor, the only benefits to be realized thereby would be economies in packaging, ease of administration and possibly the advantage that the patient would not overlook taking one or the other. However, it is preferred that the subject intervention compositions be taken in conjunction with a lipase inhibitor. By that is meant at the same time or within a reasonable time period, for example within about fifteen minutes, prior to the meal.

The subject nutritional intervention compositions are advantageous in that they may be taken before a meal, with a meal, or as part of a meal, although before the meal is the more preferred. The distinction between "with a meal" and "as part of a meal" as utilized herein is that the former contemplates mixing the subject compositions with a liquid food as described below to be consumed with the meal, whereas the latter contemplates incorporating the subject compositions with a solid food, e.g. yogurt, to be consumed as part of a meal. The subject nutritional intervention compositions should be taken as often as the lipase inhibitor is taken and, in fact, may be taken at a meal where the lipase inhibitor is not taken for their positive effect on the release of CCK. This is an advantage since it is recognized that individual patients may not take a lipase prior to a meal if the meal will not have a moderately high triglyceride content. An added advantage of the subject compositions is that they may be incorporated into the meal itself by mixing with or incorporating into liquid and solid foods, including water.

The subject compositions are comprised of protein in the form of casein glycomacropeptides (CMP), which is the first hydrolysis product emptied from the stomach after casein ingestion, or glycomacropeptides (GMP), which is the glycosilated form of CMP. CMP and GMP are more potent stimulators of CCK release than other types of protein and amino acids such as phenylalanine. In addition, the subject compositions comprise at least one $C_{12-18}$ fatty acid, preferably including oleic acid, and fiber, preferably a combination of soluble and insoluble fibers. The subject compositions may also contain other components that have a stimulating effect on CCK release, such as certain other proteins and a source of calcium and conventional additives such as flavoring ingredients, emulsifiers, artificial sweeteners and the like.

The subject nutritional intervention compositions are designed to achieve multiple effects leading to the increase in satiety by stimulating and maintaining levels of CCK. In addition to the stimulation of CCK thereby enhancing the feeling of satiety, the subject compositions also retard negative feedback mechanisms that act to inhibit the release of CCK resulting in a decrease in satiety. By this is meant that the subject compositions suppress the amount of bile salts released by the gall bladder, thereby reducing the level thereof in the intestine.

The protein component of the present invention is comprised of a source of glycomacropeptide (GMP) or casein glycomacropeptide (CMP) which is preferably whey protein concentrate, and contain other proteins such as casein, whey and soy proteins. The protein component comprises from 13.84% to 19.32% by weight, of which from 0.34% to 3.86% by weight is a glycomacropeptide or caseinmacropeptide, both ranges based on the total composition. A preferred composition contains 3.15% by weight of GMP or CMP and 2.31% of other proteins as described above.

The fatty acid component of the subject compositions comprises from 32.82% to 42.47% by weight of at least one $C_{12-18}$ fatty acid, preferably at least one $C_{18}$ fatty acid, of which from about 13.50% to about 15.46% is oleic acid, both ranges based on the total compositions. A preferred composition contains 15.11% of oleic acid and 22.67% of other $C_{12-18}$ fatty acids. Sources of oleic acid include babassu oil, butter oil, cocoa butter, coconut oil, safflower oil, soybean oil, palm kernel oil, peanut oil and the like.

The fiber component of the subject compositions may be soluble or insoluble fiber, but is preferably a combination of both. The total fiber content of the subject compositions is from 20.25% to 27.05% by weight and is preferably comprised of from about 13.50% to 15.46% by weight of soluble fiber and from about 6.75% to about 11.59% by weight of insoluble fiber, the latter ranges being of the total composition. A preferred composition is comprised of 12.06% by weight of soluble fiber and 7.17% by weight of insoluble fiber. Suitable soluble fiber for the subject compositions may be obtained from sources such as guar, glucomannan, potato, methyl cellulose, psyllium, pectin, oat fiber, sugar beets and the like. Suitable sources of insoluble fiber for the subject compositions include alfalfa, cellulose, lignin, hemicelluloses, cholestyramine, potato, methylcellulose derivatives, insoluble pectins and the like. Preferred sources of soluble fiber are guar and glucomannan and of insoluble fiber are alfalfa, potato and cholestyramine.

The subject compositions preferably contain a source of calcium, which has been shown to stimulate CCK release through a different mechanism than the other CCK stimulating agents described above. Suitable sources of calcium include the citrate, carbonate, lactate, maleate, citrate maleate and the like, The source of calcium comprises from 0.57% to 0.68% by weight, preferably 0.57% by weight of the subject compositions.

The nutritional intervention compositions of the present invention further include conventional ingredients such as a flavoring system, artificial sweeteners, emulsifiers and the like. The flavoring system typically is comprised of a flavoring component and one or more palatability additives that enhance the taste, color and "feel" of the composition. such as, being and suitable flavoring, sweeteners, emulsifiers and the like. Suitable flavoring components include one or more of water soluble, natural or artificial extracts including apple, banana, cherry, cinnamon, cranberry, grape, honeydew, honey, kiwi, lemon, lime, orange, peach, peppermint, pineapple, raspberry tangerine, watermelon, wild cherry and the like. A preferred palatability enhancing additive is maltodextrin, which is present in from 5.80% to 6.75% by weight. Artificial sweeteners, such as aspartane, and emulsifiers suitable for food products, such lecithin, are each utilized in an amount sufficient to impart its characteristic property to the composition. The total of such conventional ingredients in the compositions of the present invention is from 18.28 to 24.71% by weight of the subject compositions.

The present invention provides for a nutritional intervention composition in powder form for enhancing satiety when taken in conjunction with a lipase inhibitor. The subject compositions may be added to or incorporated into solid foods such as, without intended limitation, yogurt, gelatin desert preparations, apple sauce, cottage cheese, cereal, bread, nutrition bars, candy bars and the like. The subject compositions may also be added to liquid foods including, without intended limitation, water, milk and milk drinks, various fruit juices, broth consommé and the like.

The subject compositions are utilized in an amount sufficient to provide the desired stimulating effect on CCK release. In general, such an amount comprises from about 5 to 30 grams, preferably from about 7 to 25 grams, most preferably about 15 grams of the composition per meal. Such amounts are calorically efficient in that they contain, on the average, from as low as 50 calories to as high as 250 calories, typically from about 100 to 175 calories per serving, which is compatible with typical weight control programs.

The following Example illustrates suitable compositions representative of those of the present invention that are useful in enhancing the efficacy of lipase inhibitors as described above.

EXAMPLE 1

| Ingredient | Source | Grams | Percent | Range (grams) Lower | Range (grams) Upper | Per Cent Lower | Per Cent Upper |
|---|---|---|---|---|---|---|---|
| Protein | Casein, whey, soy | 2.31 | 14.55 | 1.00 | 4.00 | 13.50 | 15.46 |
| Glycomacropeptide | Casein | 0.50 | 3.15 | 0.03 | 1.00 | 0.34 | 3.86 |
| Oleic acid | | 2.40 | 15.11 | 1.00 | 4.00 | 13.50 | 15.46 |
| Other long chain fatty acid | | 3.60 | 22.67 | 2.00 | 5.00 | 27.01 | 19.32 |
| Soluble Fiber | Guar, glucomannan, | 1.92 | 12.06 | 1.00 | 4.00 | 13.50 | 15.46 |
| Insoluble Fiber | Alfalfa, cholestyramine, potato | 1.14 | 7.17 | 0.50 | 3.00 | 6.75 | 11.59 |
| Calcium | Lactate, Carbonate | 0.09 | 0.57 | 0.05 | 0.15 | 0.68 | 0.58 |
| Flavors | | 2.20 | 13.85 | 1.10 | 3.00 | 14.85 | 11.59 |
| Emulsifiers | Lecithin | 0.20 | 1.26 | 0.20 | 0.40 | 2.70 | 0.77 |
| Artificial sweeteners | Aspartame | 0.03 | 0.20 | 0.015 | 0.60 | 0.41 | 0.12 |
| Palatability Additive | Maltodextrin | 1.00 | 6.30 | 0.50 | 1.50 | 6.75 | 580 |
| | | 15.88 | 100.00 | 7.41 | 25.88 | 100.00 | 100.00 |

What is claimed is:

1. A method of enhancing the efficacy of a lipase inhibitor that is ingested by a human before a meal for the purpose of decreasing the amount of ingested triglycerides that are metabolized into absorbable fats, said method comprising in conjunction with a lipase inhibitor administering before or during said meal to said human a nutritional intervention composition comprising:
   a) one or more proteins comprising at least a glycomacropeptide or caseinmacropeptide, being in the range of 13.84% to 19.32% by weight of said composition;
   b) at least one $C_{12-18}$ fatty acid comprising at least oleic acid, being in the range of 32.82% to 42.47% by weight of said composition; and
   c) a fiber component comprising at least one of soluble fibers and insoluble fibers, being in the range of 20.25% to 27.05% by weight of said composition.

2. A method in accordance with claim 1, wherein in said composition, component a) comprises a glycomacropeptide or caseinmacropeptide, being in the range of 0.34% to 3.86% by weight of said composition with the remainder thereof being casein, whey and soy proteins.

3. A method in accordance with claim 1, wherein in said composition, component b) comprises oleic acid, being in the range of 13.50% to 15.46% by weight of said composition with the remainder thereof being $C_{12-18}$ fatty acids other than oleic acid.

4. A method in accordance with claim 1, wherein in said composition, component c) comprises soluble fibers, being in the range of 13.50% to 15.46% by weight of said composition, and insoluble fibers, being in the range of 6.75% to 11.59% by weight of said composition.

5. A method in accordance with claim 1, wherein in said composition additionally contains a source of calcium, being in the range of 0.57% to 0.68% by weight of said composition.

6. A method in accordance with claim 1, wherein said composition additionally contains a suitable flavoring system, artificial sweeteners and emulsifiers, said components, in total, being in the range of 18.28% to 24.71% by weight of said composition and a source of calcium, being in the range of 0.57% to 0.68% by weight of said composition.

7. A method in accordance with claim 1, wherein said composition comprises:

a) one or more proteins comprising at least a glycomacropeptide or caseinmacropeptide, said glycomacropeptide or caseinmacropeptide comprising 3.15% by weight of said composition;

b) at least one $C_{12-18}$ fatty acid comprising at least oleic acid, wherein oleic acid comprises 15.11% by weight of said composition; and c) a fiber component comprising soluble fibers, being in the range of 13.50% to 15.46% by weight of said composition and insoluble fibers, being in the range of 6.75% to 11.59% by weight of said composition.

8. A method in accordance with claim 1, wherein said nutritional intervention composition is administered prior to said meal.

9. A method in accordance with claim 1, wherein said composition is administered during said meal.

* * * * *